United States Patent
Rentala

(10) Patent No.: US 8,915,059 B2
(45) Date of Patent: Dec. 23, 2014

(54) FUEL GAS PRESSURE CONTROL SYSTEM AND METHOD FOR REDUCING GAS TURBINE FUEL SUPPLY PRESSURE REQUIREMENTS

(75) Inventor: Pradeep Rentala, Hyderabad Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 775 days.

(21) Appl. No.: 13/229,202

(22) Filed: Sep. 9, 2011

(65) Prior Publication Data

US 2013/0061596 A1    Mar. 14, 2013

(51) Int. Cl.
| | | |
|---|---|---|
| *F02C 9/38* | (2006.01) | |
| *F02C 9/32* | (2006.01) | |
| *F23N 1/00* | (2006.01) | |
| *F02C 7/228* | (2006.01) | |
| *F02C 9/26* | (2006.01) | |
| *F23K 5/00* | (2006.01) | |
| *F23R 3/28* | (2006.01) | |
| *F23N 5/18* | (2006.01) | |

(52) U.S. Cl.
CPC ............... *F23N 1/002* (2013.01); *F02C 7/228* (2013.01); *F02C 9/263* (2013.01); *F23K 5/005* (2013.01); *F23R 3/28* (2013.01); *F23N 2005/185* (2013.01); *F05D 2270/301* (2013.01)
USPC ......................................... 60/39.281; 60/773

(58) Field of Classification Search
USPC .......... 60/39.281, 773, 39.465, 772, 733, 739
See application file for complete search history.

(56) References Cited

U.S. PATENT DOCUMENTS

| | | | |
|---|---|---|---|
| 6,092,362 A | 7/2000 | Nagafuchi et al. | |
| 7,441,398 B2 | 10/2008 | Ziminsky et al. | |
| 7,549,293 B2 * | 6/2009 | Gallagher et al. | ............... 60/773 |
| 2008/0016875 A1 | 1/2008 | Ryan et al. | |
| 2009/0241510 A1 | 10/2009 | Gallagher et al. | |

FOREIGN PATENT DOCUMENTS

WO    2010/027383 A1    3/2010

OTHER PUBLICATIONS

Search report issued in connection with Ep Application No. 12183151.5; May 7, 2013.

* cited by examiner

*Primary Examiner* — Andrew Nguyen
(74) *Attorney, Agent, or Firm* — Sutherland Asbill & Brennan LLP

(57) ABSTRACT

A method is provided for modifying a fuel control system for a gas turbine having a standard unloading sequence and a pre-defined minimum inlet pressure requirement associated with the standard unloading sequence to allow the gas turbine to operate over an increased range of fuel supply pressure. The method includes modifying the fuel control system by inputting a modified unloading sequence onto a computing system operatively associated with the fuel control system, the modified unloading sequence comprising a series of operating modes, mode transfers, or a combination thereof that is different than the standard unloading sequence; and modifying the fuel control system by inputting a new defined minimum inlet pressure requirement for the modified unloading sequence onto the computing system, the new defined minimum inlet pressure requirement being less than the pre-defined minimum inlet pressure requirement thereby reducing a fuel supply pressure trip point for the gas turbine.

12 Claims, 5 Drawing Sheets

FUEL GAS PRESSURE CONTROL SYSTEM AND METHOD FOR REDUCING GAS TURBINE FUEL SUPPLY PRESSURE REQUIREMENTS

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This disclosure is generally in the field of fuel supply pressure control. More particularly, the present disclosure is directed to control systems and methods for reducing gas turbine fuel supply pressure requirements.

A minimum gas fuel supply pressure is required to provide the motive force for the fuel to overcome losses due to strainers, valves, piping and fuel nozzles, and enter the combustion chamber of a gas turbine under all potential operating conditions.

The existing gas fuel control system is based on a fixed gas fuel supply pressure requirement (referred to as P2 pressure requirement) from full speed no load (FSNL) to base load, in some cases with adjustment for ambient temperature conditions. If the gas fuel supply pressure is less than the control system pressure requirement, the gas turbine is inhibited from starting. If the gas fuel supply pressure falls below the control system requirement during operation, the control system initiates a runback to a predetermined low load mode of operation and operator action is then required.

It would therefore be desirable to provide new fuel gas pressure control systems and methods for reducing gas turbine fuel supply pressure requirements.

BRIEF DESCRIPTION OF THE INVENTION

In one aspect, a method is provided for modifying a fuel control system for a gas turbine having a standard unloading sequence and a pre-defined minimum inlet pressure requirement associated with the standard unloading sequence to allow the gas turbine to operate over an increased range of fuel supply pressure. The method includes modifying the fuel control system by inputting a modified unloading sequence onto a computing system operatively associated with the fuel control system, the modified unloading sequence comprising a series of operating modes, mode transfers, or a combination thereof that is different than the standard unloading sequence; and modifying the fuel control system by inputting a new defined minimum inlet pressure requirement for the modified unloading sequence onto the computing system, the new defined minimum inlet pressure requirement being less than the pre-defined minimum inlet pressure requirement thereby reducing a fuel supply pressure trip point for the gas turbine.

In another aspect, a method is provided for modifying a fuel control system for a gas turbine having a standard unloading sequence and a pre-defined minimum inlet pressure requirement associated with the standard unloading sequence to allow the gas turbine to operate over an increased range of fuel supply pressure. The method includes receiving a modified unloading sequence on a computing system operatively associated with the fuel control system, the modified unloading sequence comprising a series of operating modes, mode transfers, or a combination thereof that is different than the standard unloading sequence; receiving a new defined minimum inlet pressure requirement for the modified unloading sequence on the computing system, the new defined minimum inlet pressure requirement being less than the pre-defined minimum inlet pressure requirement thereby reducing a fuel supply pressure trip point for the gas turbine; and electronically storing the modified unloading sequence and the new defined minimum inlet pressure requirement on a computer-readable medium associated with the computing system.

In yet another aspect, a fuel control system is provided for a gas turbine for controlling a stop/speed ratio valve and a plurality of gas control valves. Each of the plurality of gas control valves control the flow rate of a gas through at least one nozzle in a gas turbine combustor. The control system includes a controller operatively associated with the stop/speed ratio valve and the plurality of gas control valves. The controller is configured to control the plurality of gas control valves to provide a gas fuel split to the gas turbine combustor in accordance with a non-standard, modified unloading schedule defining a loading sequence, an unloading sequence, or a combination thereof. The control system defines a modified minimum allowable inlet pressure requirement over the loading sequence, the unloading sequence, or a combination thereof. The minimum inlet pressure requirement is less than a standard minimum inlet pressure requirement for the fuel control system, such that the control system reduces a fuel supply pressure trip point for the gas turbine.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
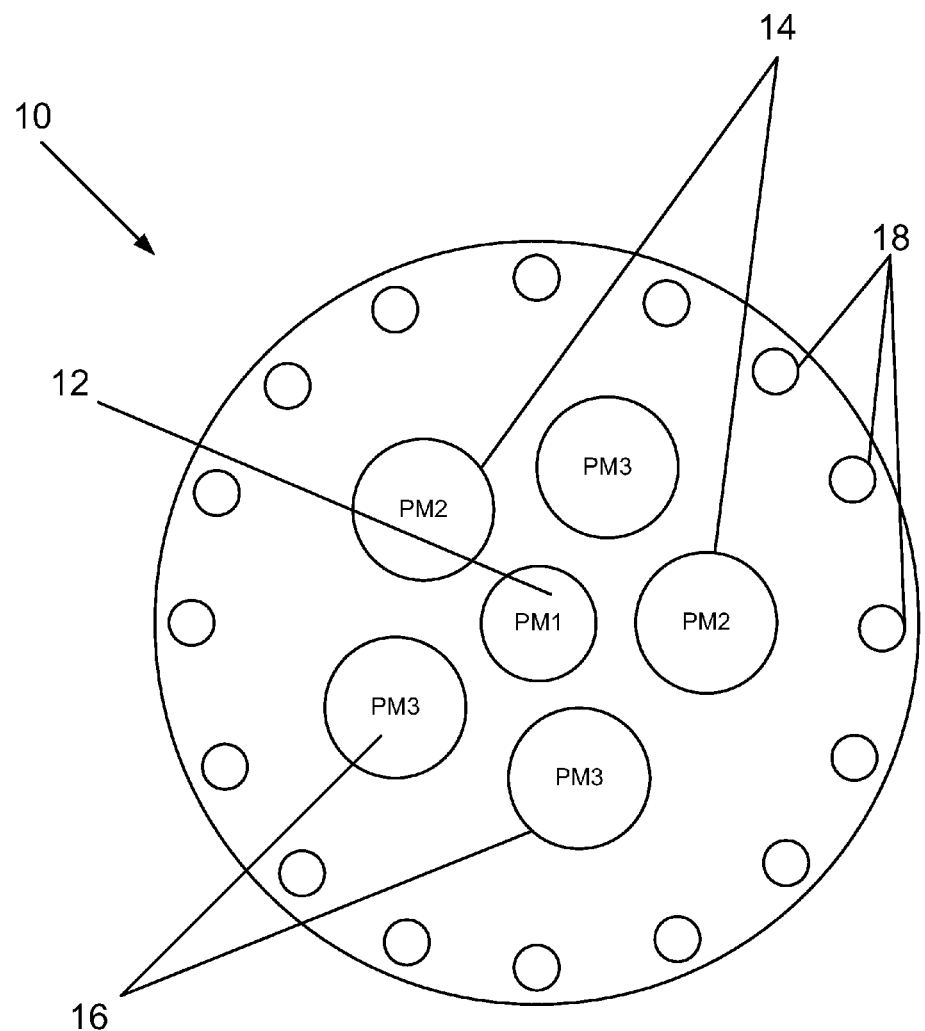
FIG. 1 is a depiction of a nozzle arrangement for a combustor can which may be utilized in one or more embodiments of the present invention.

Methods and control systems are provided according to an example embodiment of the invention to allow the gas turbine to operate at lower supply pressures than those dictated by conventional fuel pressure control techniques and as such increases the operability window.

A method is provided for modifying a fuel control system for a gas turbine having a pre-existing operating range, e.g., a standard loading and/or unloading sequence and a pre-defined minimum inlet pressure requirement associated with the standard unloading sequence to allow the gas turbine to operate over an increased range of fuel supply pressure. In an exemplary embodiment, the methods and systems disclosed herein increase the operating range of a gas turbine from a pre-existing operating range to a new operating range. Gas control systems modified by such methods are also provided.

The term "operating range" as used herein refers to a loading and/or unloading range over which a gas turbine may operate in accordance with its associated fuel control system. The term "standard unloading sequence", "standard unloading schedule" and the like, as used herein, refers to an original unloading sequence executed by a computing system, e.g., a controller, provided as part of a combustion system for a gas turbine. When a combustion system is provided to a customer, a control system that is pre-programmed with standard unloading sequences and associated minimum inlet pressure requirement curves for the gas turbine and combustion system may be provided with the combustion system. The standard unloading sequence may be tailored to a specific gas turbine and gas combustion system. The terms "non-standard" and/or "modified" therefore refer to an unloading schedule or minimum inlet pressure requirement that has been changed from the original unloading sequence or minimum pressure requirement executed by the computing system for the combustion system and gas turbine.

The method may include modifying the fuel control system by inputting a modified unloading sequence onto the computing system, e.g., the controller, that is operatively associated with the fuel control system. The modified unloading sequence may include a series of operating modes, mode transfers, or a combination thereof that is different than the standard unloading sequence. The method may also include modifying the fuel control system by inputting a new defined minimum inlet pressure requirement for the modified unloading sequence onto the computing system. The new defined minimum inlet pressure requirement may be less than the pre-defined minimum inlet pressure requirement. In such a case, the modified unloading sequence and new defined minimum inlet pressure requirement may reduce a fuel supply pressure trip point for the gas turbine. The modified unloading sequence and new defined minimum inlet pressure requirement may also minimize the gas fuel compressor's operation relative to that which is required for the standard unloading sequence and the pre-defined minimum inlet pressure requirement.

In an exemplary embodiment, the fuel control system is operatively associated with a stop/speed ratio valve and a plurality of gas control valves. Each of the plurality of gas control valves may control the flow rate of a gas through at least one nozzle in a gas turbine combustor. In certain embodiments, the computing system controls the actuation of the stop/speed ratio valve and plurality of gas control valves in accordance with the modified unloading sequence. The modified unloading sequence may provide a gas fuel split to the gas turbine combustor that achieves a reduction in an emission level for a pollutant produced by the gas turbine combustor relative to the standard unloading sequence.

In another aspect, the method may include receiving a modified unloading sequence on a computing system operatively associated with the fuel control system. The modified unloading sequence may include a series of operating modes, mode transfers, or a combination thereof that is different than the standard unloading sequence. The method may also include receiving a new defined minimum inlet pressure requirement for the modified unloading sequence on the computing system. The new defined minimum inlet pressure requirement being less than the pre-defined minimum inlet pressure requirement. In such a case, the modified unloading sequence and new defined inlet pressure requirement may reduce a fuel supply pressure trip point for the gas turbine. The method may further include electronically storing the modified unloading sequence and the new defined minimum inlet pressure requirement on a computer-readable medium associated with the computing system. In an exemplary embodiment, the method may further include controlling the actuation of the stop/speed ratio valve and plurality of gas control valves in accordance with the modified unloading sequence.

In yet another aspect, a fuel control system is provided for a gas turbine for controlling a stop/speed ratio valve and a plurality of gas control valves. Each of the plurality of gas control valves may control the flow rate of a gas through at least one nozzle in a gas turbine combustor. The control system may include a controller operatively associated with the stop/speed ratio valve and the plurality of gas control valves. The controller may be configured to control the plurality of gas control valves to provide a gas fuel split to the gas turbine combustor in accordance with a non-standard, modified loading or unloading schedule defining a loading sequence, an unloading sequence, or a combination thereof. The control system may define a modified minimum allowable inlet pressure requirement over the loading sequence, the unloading sequence, or a combination thereof. The minimum inlet pressure requirement may be less than a standard minimum inlet pressure requirement for the fuel control system. In such a case, the modified unloading sequence and new defined inlet pressure requirement may reduce a fuel supply pressure trip point for the gas turbine.

In an exemplary embodiment, the non-standard, modified unloading schedule defining an unloading sequence and the modified minimum allowable inlet pressure requirement may be electronically stored on a computer-readable medium associated with the controller. In certain embodiments, the non-standard, modified unloading schedule may provide a gas fuel split to the gas turbine combustor that achieves a reduction in an emission level for a pollutant produced by the gas turbine combustor.

In an exemplary embodiment, the control system may be employed to control the gas fuel split and fuel pressure to one or more gas turbine combustors. The gas turbine may include any number of combustors. In one embodiment, the gas turbine includes 14 combustors. As illustrated in FIG. 1, each gas turbine combustor 10 may include a plurality of nozzles 12, 14, 16, 18. For example, the combustor 10 may include a single, central premix1 (PM1) nozzle 12. The combustor 10 also may include two premix2 (PM2) nozzles 14 and three premix3 (PM3) nozzles 16 radially spaced from the PM1 nozzle 12 and angularly spaced apart from each other about the PM1 nozzle 12. The combustor 10 may further include an outer ring of Quat nozzles 18 surrounding the PM1 nozzle 12 and PM2/PM3 nozzles 14, 16. Various other combustor configurations may also be employed.

Figure 2:
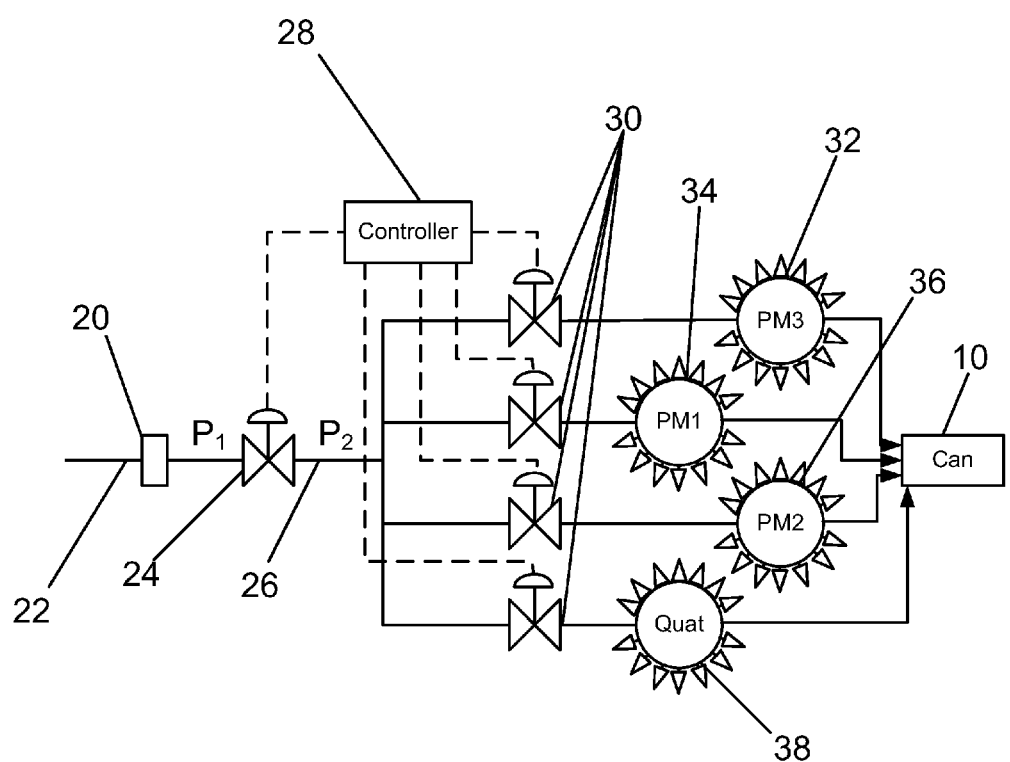
FIG. 2 is a schematic illustration of a control system which may be used in accordance with one or more embodiments of the present invention.

An exemplary control system is illustrated schematically in FIG. 2. Fuel gas may be supplied through a strainer 20, which removes entrained particles from the fuel gas, to a stop/speed ratio valve ("SRV") 24 by a fuel supply line 22 at a fuel gas supply pressure ($P_1$). The fuel gas may be supplied to a plurality of gas control valves 30 from the stop/speed ratio valve 24 by a fuel supply circuit 26. It should be appreciated that $P_1$ pressure is the pressure downstream of the strainer 20 and upstream of the SRV 24, whereas the $P_2$ pressure is the pressure downstream of the SRV 24, as supplied to the gas control valves 30. Each of the gas control valves 30 controls the flow of fuel gas to a premix fuel manifold. In some embodiments, four premix fuel manifolds 32, 34, 36, and 38 are employed. PM3 fuel manifold 32 may supply fuel to each of the PM3 nozzles 16, PM1 fuel manifold 34 may supply fuel to each of the PM1 fuel nozzles 12, PM2 fuel manifold 36 may supply fuel to each of the PM2 nozzles 14, and Quat fuel manifold 38 may supply fuel to each of the Quat nozzles 18. Thus, it should be appreciated that the gas control valves 30 control how the fixed gas fuel supply pressure ($P_2$) is distributed in the gas fuel supply circuit 26, and thereby controls the gas fuel split, i.e., the relative flow rates through each of the types of nozzles 12, 14, 16, 18, at each combustor 10. A controller 28 controls the SRV 24 to provide the desired fixed fuel supply pressure ($P_2$) and the gas control valves 30 to provide the desired gas fuel split.

Figure 3:
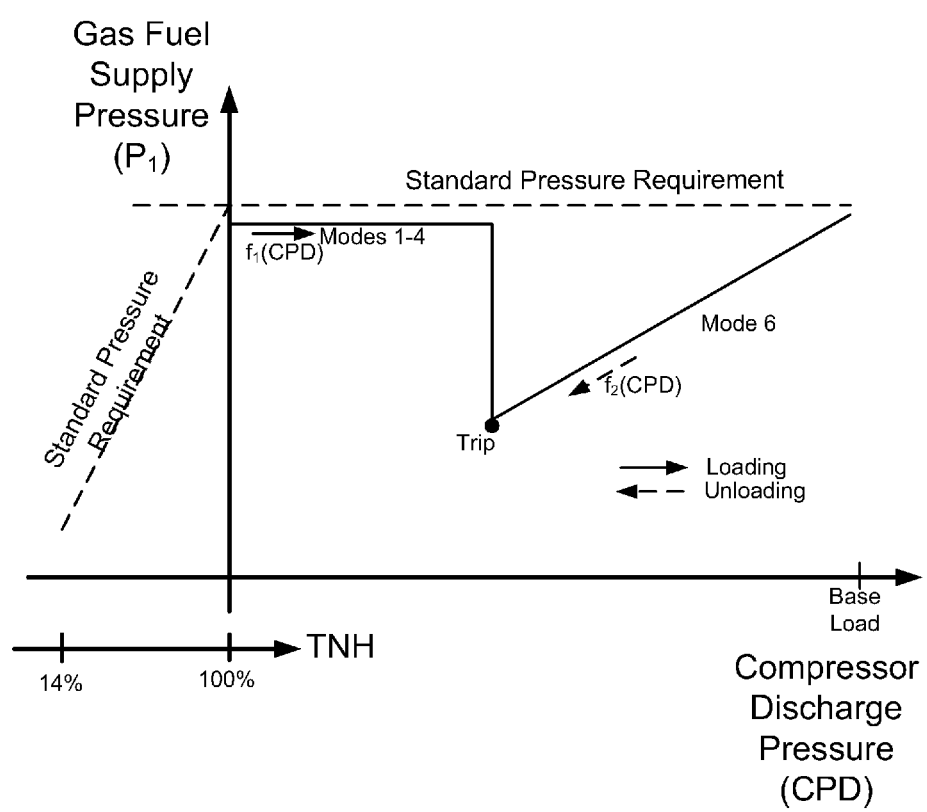
FIG. 3 is a schematic illustration of the operability range of a combustor utilizing P2 pressure reference selection based on compressor discharge pressure.

As illustrated in FIG. 3, fuel gas may be supplied to the combustor in accordance with a standard pressure schedule. The dashed line in FIG. 3 shows the standard supply pressure requirement, which is a fixed number at any gas turbine load. Fuel pressure may be controlled by adjustment of the SRV to provide an increasing fixed fuel gas supply pressure ($P_2$) as the gas turbine is driven throughout the speed load reference (TNR) range. As described previously, the fuel is delivered into the combustors 10 of the gas turbine via different combinations of nozzles 12, 14, 16, 18 in accordance with a programmed fuel schedule. The controller 28 may actuate the transition between two or more operating modes of the fuel schedule by controlling the flow of fuel gas to different combinations of fuel gas manifolds 32, 34, 36, 38. The transition from one combination of fuel nozzles to another is known as a "mode transfer."

The specific fuel schedule that is employed is dictated by a number of factors. At low air flow levels, there is not enough fuel to maintain the required pressure across all nozzles, therefore some of the nozzles must be turned off. When load is added, the control system may actuate a series of mode transfers in a programmed sequence in accordance with the fuel schedule. Generally, as load and air flow increase, the fuel requirement increases (to maintain a constant fuel/air ratio) such that more fuel nozzles can be turned on. The nozzles are turned on and off by actuation of the gas control valves 30 by the controller 28.

If fuel supply pressure ($P_1$) were to suddenly drop, the gas turbine may be operated at a reduced load, the specific reduced load being defined by a minimum pressure requirement for the load at the available fuel supply pressure ($P_1$). Thus, if the supply pressure drops below the standard pressure requirement when operating at base load, the control system unloads the gas turbine along the solid pressure requirement line. The solid line shows a minimum requirement that is defined as a function of CPD. It should be appreciated that the minimum pressure requirement defines an operability window beneath the standard pressure requirement at which the gas turbine may be operated. When the fuel supply pressure ($P_1$) drops below the minimum pressure requirement, the gas turbine trips.

The fuel schedule employed in the control of a gas fuel control system for a gas turbine may be designed to optimize the efficiency of loading and unloading operations. Fuel schedules may also be designed to reduce the production of pollutants, such as NOx. For example, some gas fuel control systems may employ control schemes that adjust fuel schedules to achieve a target NOx emission level, e.g., a target maximum or minimum level. U.S. Pat. No. 7,441,398, which is incorporated herein by reference in its entirety, describes an exemplary control system that utilizes gas fuel split adjustment to achieve a target pollutant emission level. Various other fuel gas control schemes may be employed to achieve target emission levels for pollutants produced by gas turbines. Generally, these control systems operate by controlling each of the gas control valves to yield a gas fuel split to the nozzle (i.e., the desired distribution of fuel through the various manifolds, each of which supplying the fuel to different portions of the nozzle) to produce a flame in the combustor having the desired combustion dynamics for producing the desired gas turbine load while achieving the desired emission characteristics. The specific control scheme that is employed to control the pollutant may depend on the design of the nozzle, the design of the fuel supply system, the design of the gas turbine, the composition of the fuel, the type of pollutant, and the target emission level for the pollutant. NOx and CO emissions, for example, are a function of both flame temperature and fuel-air mixing. The fuel-air mixing is a function of various combustion dynamics, including acoustic vibration and noise in the combustor induced by pressure pulses. Emission-based control schemes may be employed during one or more loading or unloading ranges, i.e., when operating between one or more discrete load ranges or continuously between full speed no load (FSNL) and base or "peak" load.

Figure 4:
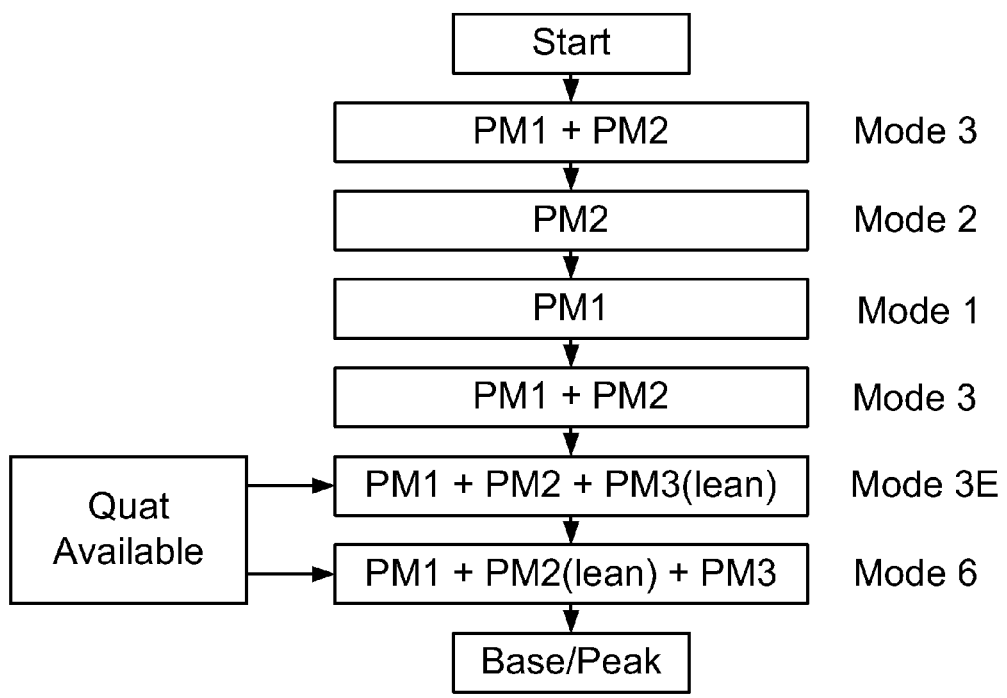
FIG. 4 is a schematic illustration of a gas turbine loading and/or unloading schedule incorporating a gas fuel split schedule according to one or more embodiments of the present invention.

An exemplary fuel schedule for loading and/or unloading a gas turbine in accordance with one or more embodiments of the present invention is illustrated in FIG. 4. The illustrated fuel schedule may be employed, for example, in a DLN type Combustion System, which is available from G.E. Energy. In the illustrated schedule, the gas turbine undergoes a series of mode transfers from ignition to base/peak load. For example, combustion may be initiated and the gas turbine may operate in a Mode 3 in which fuel is supplied only to the PM1 and PM2 nozzles via the PM1 and PM2 manifolds. The controller 28 then may actuate a mode transfer to a Mode 2 in which fuel is supplied only to the PM2 nozzles. The controller 28 then may actuate a mode transfer to a Mode 1 in which fuel is supplied only to the PM1 nozzle. The controller 28 then may actuate a mode transfer to the Mode 3 for a second time. The controller 28 then may actuate a mode transfer to a Mode 3E in which fuel is supplied to the PM1, PM2 and PM3 nozzles. In the Mode 3E, the PM3 nozzles may be lean relative to the PM1 and PM2 nozzles such that the PM3 nozzles deliver fuel at a reduced flow rate relative to the PM1 and PM2 nozzles. The controller 28 then may actuate a mode transfer to a Mode 6 in which fuel is supplied to the PM1, PM2 and PM3 nozzles. In the Mode 6, the PM2 nozzles may be lean relative to the PM1 and PM3 nozzles such that the PM2 nozzles deliver fuel at a reduced flow rate relative to the PM1 and PM3 nozzles. During Mode 3E and Mode 6, fuel may also be supplied through the Quat nozzles as desired to produce the desired combustion dynamics.

In an exemplary embodiment, the control system may be configured to control the plurality of gas control valves to yield a gas fuel split to the combustor that achieves a target emission level for a pollutant produced by the gas turbine combustor over a specific loading and unloading range. The term "target emission level" as used herein refers to an emission control parameter that is monitored directly or indirectly. The term "pollutant" as used herein refers to an emission produced as a result of combustion or otherwise that is desired to be reduced or eliminated. Exemplary pollutants include, but are not limited to, NOx and CO. In the context of a "pollutant", the emission level may define a desired maximum emission rate or maximum concentration. In some embodiments, positive or negative feedback control mechanisms may be employed to achieve the target emission level.

In certain embodiments, the control system may control the gas fuel split over a loading and/or unloading load range between about 15% to about 50% of base load to achieve a desired NOx emission target level. This can be accomplished by balancing the combustion dynamics (e.g., adjusting the gas fuel splits) to reduce or minimize hot streaks in the combustor while the gas turbine is operating in the load range. In certain embodiments, NOx emissions may be reduced when loading the gas turbine over a load range between about 15% to about 50% by transferring to Mode 3E after operating in Mode 3 and then transferring to Mode 6 after operating in Mode 3E such as is illustrated in FIG. 4. The order may be reversed when unloading such that the gas turbine may be unloaded by operating in Mode 6, followed by Mode 3E and then Mode 3.

In another embodiment, the control system may control the gas fuel split over a loading and/or unloading load range between about 15% to about 50% of base load to achieve a desired CO emission target level. For reducing CO emissions, the combustion dynamics may be balanced by adjustment of the gas fuel splits to reduce or minimize cold streaks inside the combustor when operating in the load range.

In an exemplary embodiment, the control system defines a minimum allowable inlet pressure requirement over a loading or unloading range based on the gas fuel split. It has been found that a new, previously-unavailable operability window may be provided by defining the minimum allowable inlet pressure based on a modified unloading schedule. It should be appreciated that this new window of operability extends the minimum pressure by a $P_1$ margin greater than that which was previously available.

Figure 5:
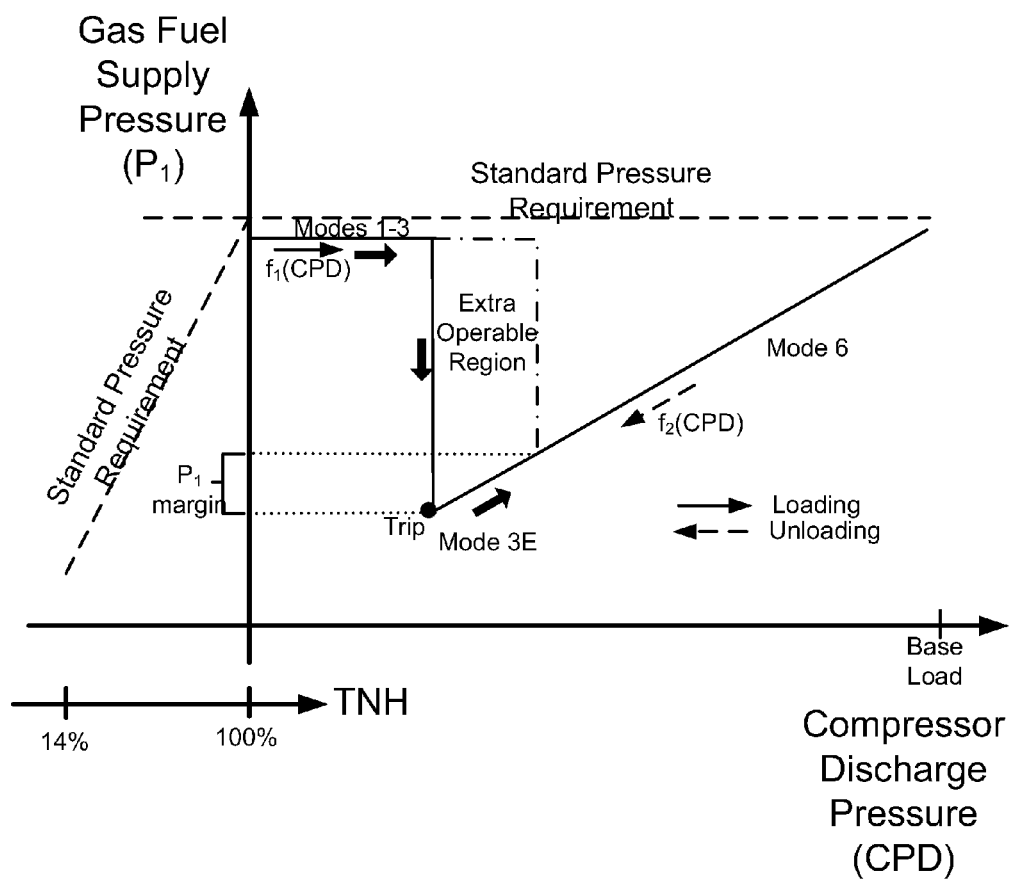
FIG. 5 is a schematic illustration of the operability range of a combustor utilizing P2 pressure reference selection based on compressor discharge pressure and a gas fuel split schedule according to one or more embodiments of the present invention.

As illustrated in FIG. 5, an extra operable region, which was previously inoperable, is available if the minimum allowable inlet pressure requirement is defined over a loading or unloading range based on the gas fuel split. In the illustrated example, the unloading range corresponding to Mode 3E provides an additional $P_1$ margin beyond that which is provided by Mode 6. By accounting for the gas fuel split schedule, such as when the gas turbine undergoes a mode transfer between Mode 6 and Mode 3E when unloading, the control system may extend the range of operation and reduce $P_1$ trip point for the gas turbine.

The controller 28 and control system may include a computer or other client or server device, which operates software or computer-executable instructions to perform the functions described herein. One of ordinary skill in the art can appreciate that a computer or other client or server device can be deployed as part of a computer network, or in a distributed computing environment. In this regard, the methods, systems, and apparatus described above and/or claimed herein pertain to any computer system having any number of memory or storage units, and any number of applications and processes occurring across any number of storage units or volumes, which may be used in connection with the methods and apparatus described above and/or claimed herein. Thus, the same may apply to an environment with server computers and client computers deployed in a network environment or distributed computing environment, having remote or local storage. The methods and apparatus described above and/or claimed herein may also be applied to standalone computing devices, having programming language functionality, interpretation and execution capabilities for generating, receiving and transmitting information in connection with remote or local services.

The methods and apparatus described above and/or claimed herein is operational with numerous other general purpose or special purpose computing system environments or configurations. Examples of well known computing systems, environments, and/or configurations that may be suitable for use with the methods and apparatus described above and/or claimed herein include, but are not limited to, personal computers, server computers, hand-held or laptop devices, multiprocessor systems, microprocessor-based systems, network PCs, minicomputers, mainframe computers, distributed computing environments that include any of the above systems or devices.

The methods described above and/or claimed herein may be described in the general context of computer-executable instructions, such as program modules, being executed by a computer. Program modules typically include routines, programs, objects, components, data structures, etc. that perform particular tasks or implement particular abstract data types. Thus, the methods and apparatus described above and/or claimed herein may also be practiced in distributed computing environments such as between different power plants or different power generator units where tasks are performed by remote processing devices that are linked through a communications network or other data transmission medium. In a typical distributed computing environment, program modules and routines or data may be located in both local and remote computer storage media including memory storage devices. Distributed computing facilitates sharing of computer resources and services by direct exchange between computing devices and systems. These resources and services may include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the methods and apparatus described above and/or claimed herein.

Computer programs implementing the method described above will commonly be distributed to users on a distribution medium such as a CD-ROM. The program could be copied to a hard disk or a similar intermediate storage medium. When the programs are to be run, they will be loaded either from their distribution medium or their intermediate storage medium into the execution memory of the computer, thus configuring a computer to act in accordance with the methods and apparatus described above.

The term "computer-readable medium" encompasses all distribution and storage media, memory of a computer, and any other medium or device capable of storing for reading by a computer a computer program implementing the method described above. Thus, the various techniques described herein may be implemented in connection with hardware or software or, where appropriate, with a combination of both. Thus, the methods and apparatus described above and/or claimed herein, or certain aspects or portions thereof, may take the form of program code or instructions embodied in tangible media, such as floppy diskettes, CD-ROMs, hard drives, or any other machine-readable storage medium, wherein, when the program code is loaded into and executed by a machine, such as a computer, the machine becomes an apparatus for practicing the methods and apparatus of described above and/or claimed herein. In the case of program code execution on programmable computers, the computing device will generally include a processor, a storage medium readable by the processor, which may include volatile and non-volatile memory and/or storage elements, at least one input device, and at least one output device. One or more programs that may utilize the techniques of the methods and apparatus described above and/or claimed herein, e.g., through the use of a data processing, may be implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of described above and/or claimed herein may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or a receiving machine having the signal processing capabilities as described in exemplary embodiments above becomes an apparatus for practicing the method described above and/or claimed herein. When implemented on a general-purpose processor, the program code combines with the processor to provide a unique apparatus that operates to invoke the functionality of the methods and apparatus of described above and/or claimed herein. Further, any storage techniques used in connection with the methods and apparatus described above and/or claimed herein may invariably be a combination of hardware and software. The technical effect of the executable code is to facilitate the present methods and functions described herein.

While the methods and apparatus described above and/or claimed herein have been described in connection with the preferred embodiments and the figures, it is to be understood that other similar embodiments may be used or modifications and additions may be made to the described embodiment for performing the same function of the methods and apparatus described above and/or claimed herein without deviating therefrom. Furthermore, it should be emphasized that a variety of computer platforms, including handheld device operating systems and other application specific operating systems are contemplated, especially given the number of wireless networked devices in use.

While the invention is described with reference to the above embodiments, it is contemplated that the benefits of the invention accrue to alternative types and configurations. Consequently, the description set forth above is for illustrative purposes only, and is not intended to restrict or limit the invention to any particular embodiment.

In addition, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of modifying a fuel control system for a gas turbine having a standard unloading sequence and a pre-defined minimum inlet pressure requirement associated with the standard unloading sequence to allow the gas turbine to operate over an increased range of fuel supply pressure comprising:

modifying the fuel control system by inputting a modified unloading sequence onto a computing system operatively associated with the fuel control system, the modified unloading sequence comprising a series of operating modes, mode transfers, or a combination thereof that is different than the standard unloading sequence; and modifying the fuel control system by inputting a new defined minimum inlet pressure requirement for the modified unloading sequence onto the computing system, the new defined minimum inlet pressure requirement being less than the pre-defined minimum inlet pressure requirement thereby reducing a fuel supply pressure trip point for the gas turbine.

2. The method of claim 1, wherein the fuel control system is operatively associated with a stop/speed ratio valve and a plurality of gas control valves, each of the plurality of gas control valves controlling the flow rate of a gas through at least one nozzle in a gas turbine combustor.

3. The method of claim 2, wherein the computing system controls the actuation of the stop/speed ratio valve and plurality of gas control valves in accordance with the modified unloading sequence.

4. The method of claim 2, wherein the modified unloading sequence provides a gas fuel split to the gas turbine combustor that achieves a reduction in an emission level for a pollutant produced by the gas turbine combustor.

5. A method of modifying a fuel control system for a gas turbine having a standard unloading sequence and a pre-defined minimum inlet pressure requirement associated with the standard unloading sequence to allow the gas turbine to operate over an increased range of fuel supply pressure comprising:

receiving a modified unloading sequence on a computing system operatively associated with the fuel control system, the modified unloading sequence comprising a series of operating modes, mode transfers, or a combination thereof that is different than the standard unloading sequence;

receiving a new defined minimum inlet pressure requirement for the modified unloading sequence on the computing system, the new defined minimum inlet pressure requirement being less than the pre-defined minimum inlet pressure requirement thereby reducing a fuel supply pressure trip point for the gas turbine; and electronically storing the modified unloading sequence and the new defined minimum inlet pressure requirement on a computer-readable medium associated with the computing system.

6. The method of claim 5, wherein the fuel control system is operatively associated with a stop/speed ratio valve and a plurality of gas control valves, each of the plurality of gas control valves controlling the flow rate of a gas through at least one nozzle in a gas turbine combustor.

7. The method of claim 6, wherein the computing system controls the actuation of the stop/speed ratio valve and plurality of gas control valves in accordance with the modified unloading sequence.

8. The method of claim 5, further comprising controlling the actuation of the stop/speed ratio valve and plurality of gas control valves in accordance with the modified unloading sequence.

9. The method of claim 6, wherein the modified unloading sequence provides a gas fuel split to the gas turbine combustor that achieves a reduction in an emission level for a pollutant produced by the gas turbine combustor.

10. A fuel control system for a gas turbine for controlling a stop/speed ratio valve and a plurality of gas control valves, each of the plurality of gas control valves controlling the flow rate of a gas through at least one nozzle in a gas turbine combustor, the control system comprising:

a controller operatively associated with the stop/speed ratio valve and the plurality of gas control valves;

wherein the controller is configured to control the plurality of gas control valves to provide a gas fuel split to the gas turbine combustor in accordance with a non-standard, modified loading schedule defining an unloading sequence, the modified loading schedule defining the unloading sequence comprising a series of operating modes, mode transfers, or a combination thereof that is different than a standard unloading sequence; and wherein the control system defines a modified minimum allowable inlet pressure requirement over the unloading sequence, the minimum inlet pressure requirement being less than a standard minimum inlet pressure requirement for the fuel control system, such that the control system reduces a fuel supply pressure trip point for the gas turbine.

11. The fuel control system of claim 10, wherein the non-standard, modified loading schedule and the modified minimum allowable inlet pressure requirement are electronically stored on a computer-readable medium associated with the controller.

12. The fuel control system of claim 10, wherein the non-standard, modified loading schedule provides a gas fuel split to the gas turbine combustor that achieves a reduction in an emission level for a pollutant produced by the gas turbine combustor.

\* \* \* \* \*